May 28, 1940.                L. VAN DEREN                2,202,070
                         HYDRAULIC BRAKE COUPLING
                Original Filed July 6, 1937    2 Sheets-Sheet 1
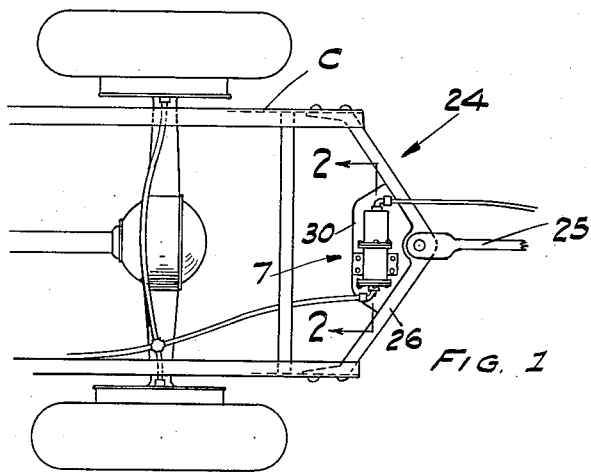
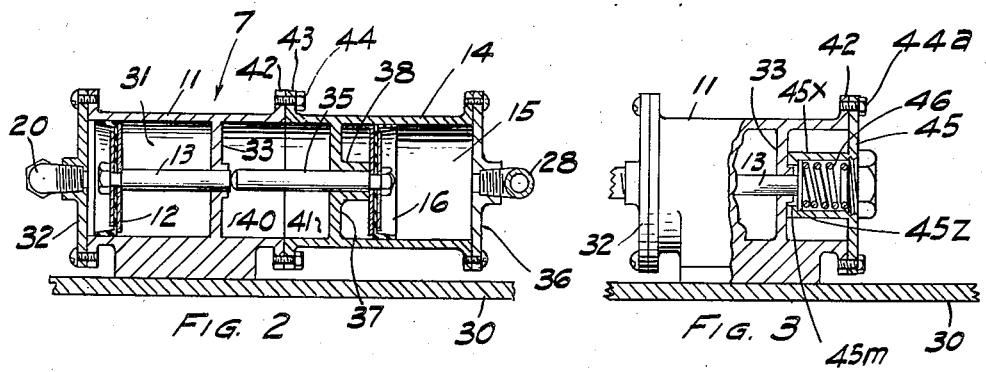
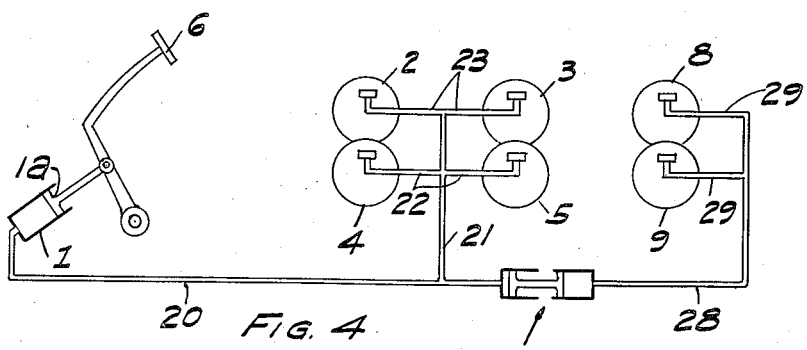
LARRY VAN DEREN
INVENTOR.
BY
ATTORNEY.

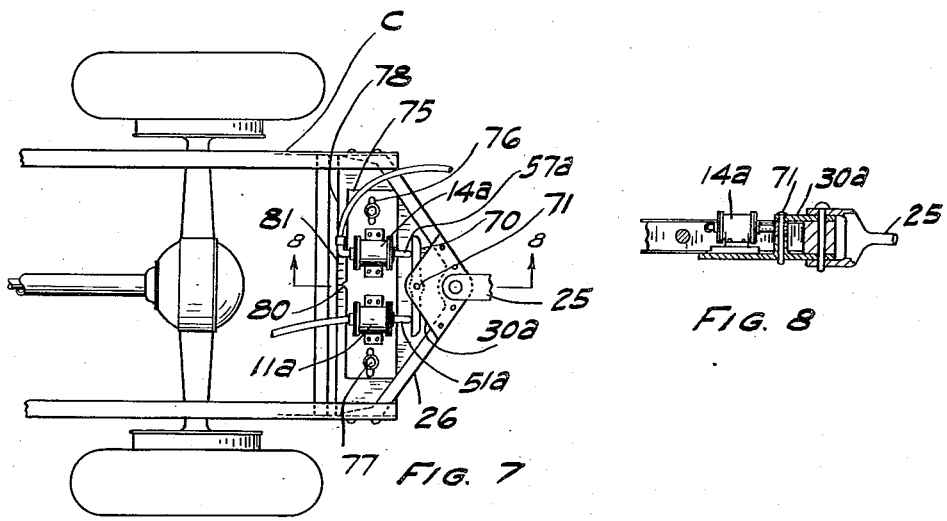
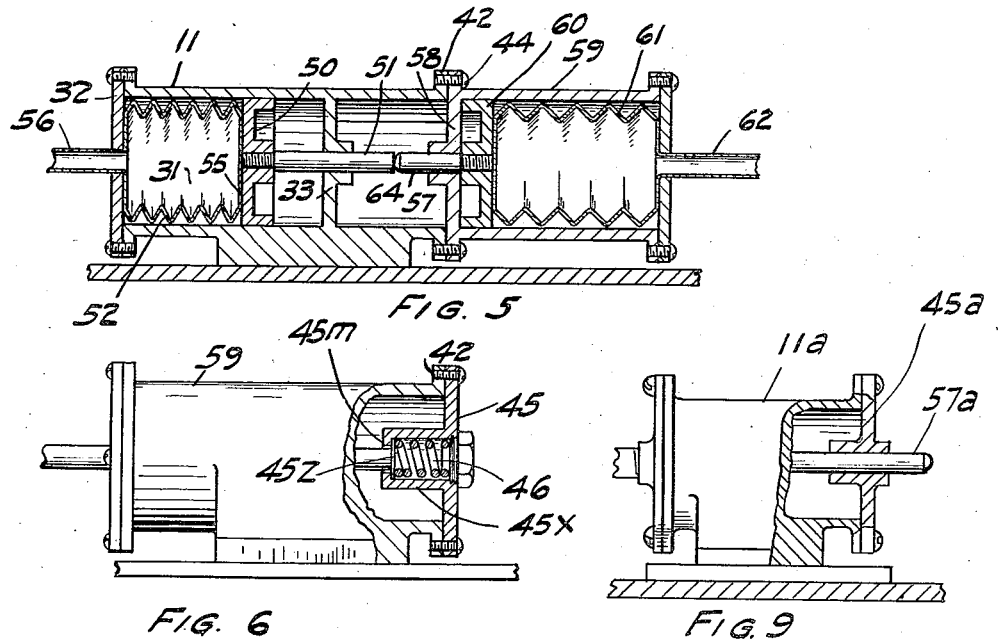

Patented May 28, 1940

2,202,070

UNITED STATES PATENT OFFICE 2,202,070

HYDRAULIC BRAKE COUPLING

Larry Van Deren, Somerton, Ariz.

Application July 6, 1937, Serial No. 152,043
Renewed November 10, 1939

7 Claims. (Cl. 188—3)

My invention relates to improvements in braking mechanism for use in simultaneously actuating the brakes of a motor vehicle and a trailer connected thereto. The invention is hereinafter described and illustrated in several of its most preferred forms.

One important object of the invention resides in the employment of improved means for hydraulically operating the brakes of a trailer in unison with the brakes of the vehicle to which it is attached, the braking force and length of brake pedal movement required to operate the brakes remaining substantially constant whether the trailer is attached or not.

Another object of the invention resides in improved means for maintaining a braking system free from leaks.

A further object resides in the improvement of a coupling for joining vehicles permitting tandem attaching and detaching without loss of braking pressure in the line.

A further object of the invention resides in the provision of improved mechanism for joining and operating separate systems of hydraulic brake mechanisms without the flow of fluid from one to the other system.

Still another object pertains to an improved means for regulating the proportional amount of the braking force which is transmitted to the brakes of the trailer. Still other objects, advantages and features of invention will hereinafter appear.

In the structure of the preferred and alternative embodiments shown in the drawings—

Fig. 1 is a plan view showing the improvement mounted on the rear end of a motor driven vehicle to which the draw-bar of a trailer is attached.

Fig. 2 is a section taken on line 2—2 of Fig. 1.

Fig. 3 is a part longitudinal side elevation and part vertical mid-section of the device with the means for actuating the brakes of the trailer shown removed.

Fig. 4 is a diagrammatic showing of the braking mechanism of tractor and trailer.

Fig. 5 is a modification of the structure shown in Fig. 2.

Fig. 6 is a part longitudinal side elevation and part vertical mid-section of the structure shown in Fig. 5 with the means for actuating the brakes of the trailer removed.

Fig. 7 is a modification of the mounting of the cylinders shown in Fig. 1.

Fig. 8 is a section taken on line 8—8 of Fig. 7.

Fig. 9 is a part longitudinal side elevation and part vertical mid-section of the cylinders shown in Fig. 7.

Referring in detail to the drawings, and at first more particularly to Figs. 1 and 4, the master or pressure supply cylinder 1 is connected by means of a main conduit 20 and branch conduits 21, 22 and 23 with the four brake operating cylinders 2, 3, 4 and 5 actuated by the pressure produced in said cylinder 1 by the piston 1a therein operated by the brake pedal 6, said pedal being mounted in a conventional manner upon the vehicle frame 24 shown in part in Fig. 1, to which the trailer is attached by means of the drawbar 25 and yoke 26.

By means of the novel coupling device 7, brake operating pressure is created in the brake cylinders 8 and 9 of the trailer thru the operation of the pedal 6, said coupling device 7 being in communication with said cylinders 8 and 9 through a conduit 28 and its branches 29.

Said coupling device 7 is shown mounted upon a platform or bracket 30 carried by the yoke 26 of the frame 24 of the trailing vehicle. Said device 7 comprises a fixed cylindrical casing 11 having fitted within it a piston head 12 furnished with a rod 13, this piston operating within a piston chamber 31 bounded at one end by a head 32 and at its opposite end by a cross wall 33 thru which the rod 13 has a working fit. The conduit 20 supplies operating pressure to the outer face of the piston head 12 through the cylinder head 32.

The cylindrical coupling device 7 also includes a detachable, cylindrical section 14 having within it a piston chamber 15 within which operates a piston head 16 furnished with a piston rod 35. Said piston chamber 15 is closed at its outer end by a head 36 thru which leads the conduit 28 which supplies the trailer brake cylinders 8 and 9. At its opposite or inner end said chamber 15 is closed by a partition or cross wall 37 which has a tubular, central projection 38 thru which the rod 35 has a working fit.

The cylindrical sections 11 and 14 of the coupling device 7, respectively have cavitated or cylindrically recessed end portions 40 and 41, each of these, in the assembled device, forming a closure for the otherwise open mouth of the other. These two sections, when assembled, are respectively furnished with abutting flanges 42 and 43 clamped together by cap screws 44. When the section 14 is secured to the section 11 by means of said cap screws the piston rods 13 and 35 are brought into alinement with each other, permitting the former rod to act in an endwise manner upon the latter. From the view point of operation, the piston having the rod 13 may be termed the primary piston and the piston against which it abuts to operate the trailer brakes the secondary piston.

When the trailer is detached from the front vehicle the cap screws 44 are removed, this permitting the coupling section 14 to be detached. Thereupon a closure disk 45, having peripheral screw holes and a compression spring 46 secured to one of its faces, is secured to the flange 42 by means of the screws 44a. A cover is thus provided for the recess 40 and at the same time the spring 46 is utilized to engage the outer end of the piston rod 13 and to offer an opposition to its outward movement which will substantially compensate for the force required to operate the brakes of the trailer when the section 14 of the coupler 7 is attached. The cover 45 is shown having a tubular extension 45x to house the spring 46 said extension having an internally flanged mouth portion 45m against which the spring impelled follower plate 45z may abut.

One advantage resulting from the provision of the closure plate 45 and the spring carried thereby is that this arrangement accustoms the driver to a certain pedal touch and prevents him from being deceived, by an inequality of resistance to the pressure of his foot upon the brake pedal, as to how much foot pressure should be applied.

In the modification shown in Figs. 5 to 9, many of the parts are substantially the same as those already described and are therefore numbered the same. Among these duplicated parts are the cylinder 11 having the outer head 32, chamber 31, internal cross wall 33 and recessed end portion 40 the mouth of which is surrounded by the apertured flange 42 to receive bolts or cap screws 44. But in place of the piston head 12 of Fig. 2 there is shown in Fig. 5 a head or follower 50 secured to the inner end of a modified piston rod 51.

A Sylphon bellows 52 occupies and substantially fills said chamber 31, said bellows having a flat end portion 55 which engages and actuates the follower 50 together with the piston rod 51. At its opposite end bellows 52 has a tubular extension 56 which takes the place of the conduit 20 of Fig. 2 and affords a pressure supply connection for said bellows to the cylinder of the pedal operable piston.

The rod 51 has a working fit thru the cross wall 33 and its projecting end portion opposes the piston rod 57 likewise working thru the head 58 of the detachable cylinder 59, said rod having secured to it the follower 60.

Within the cylinder 59 is a bellows 61, substantially a duplicate of the other bellows 52 and having a like tubular extension 62 which conveys the brake-operating pressure to the points of use. Unlike the cylinder 14 of Fig. 2, the cylinder 59 of Fig. 5 has no recessed left end, but its head 58 is directly bolted to a more deeply recessed portion 64 at the right end of the cylinder 11 of Fig. 5.

In Fig. 6 the secondary cylinder 59 of the coupling device has been detached from the primary cylinder 11 thereof and been replaced by the closure plate 45 of Fig. 3.

In Fig. 7 the primary cylinder 11a is shown juxtaposed to the secondary cylinder 14a in a parallel rather than an axial relation. In this structure the primary piston rod 51a acts upon one end portion of a transmission lever 70 (which is pivotally mounted at 71 at its midlength upon the bracket 30a) thus causing the opposite end portion of said lever acting upon the projecting end portion of piston rod 57a of the secondary cylinder 14a.

In Fig. 7 is also shown a means for regulating the amount of braking force which is supplied to the brakes of the trailer in proportion to that which is furnished to the brakes of the trailing vehicle. With this end in view, the elongated mounting plate 75 is shown having in each end portion a longitudinal slot 76 through which passes a clamping screw 77, these clamping screws being anchored in a base plate 78 secured to the chassis C.

When said clamping screws 77 are loosened, the mounting plate may be adjusted in the direction of its length carrying with it the cylinders 11a and 14a together with their piston rods 51a and 57a. The effect of this adjustment is to vary the distance of the primary piston rods from the pivot 71 of the transmission lever 70 and thus to give to the primary piston rod 51a a greater or less effective amount of braking force to be conveyed to a secondary braking system located, for example, on a trailer.

The mounting plate 75 is furnished with an indicating pointer 80 which cooperates with graduations 81 on the base plate 78 to enable the operator to determine the proper adjustment.

The secondary piston cylinder 14a may be detached from the mounting plate 75 when the trailer is not attached to the trailing vehicle.

The cylinders 11a and 14a may or may not be supplied with the bellows which have been described. Owing to the fact that the primary piston rod 51a has a contacting rather than a connected relation to the lever 70, said rod together with the head carrying it may readily be removed and then replaced by the spring-carrying plate 45 (Figs. 3 and 6) for the purpose already stated.

Fig. 9 is an enlarged side view of the primary piston cylinder 11a of Fig. 7. When the trailer is detached, the head 45a may be removed and replaced by the spring carrying cap 45 of Fig. 6.

In Fig. 8 are shown more clearly the pivotal attachments of the lever 70 and draw-bar 25.

It should be understood that the present disclosure is for the purpose of illustration only and that this invention includes all modifications and equivalents which fall within the scope of the subject matter claimed.

What is claimed is:

1. In a device of the kind described, a coupler comprising a primary and a secondary piston section detachably related to each other and each having juxtaposed piston rods operatively related whereby the piston rod of said primary section acts upon that of the secondary section to apply the brakes of a trailer, one of said coupler sections having a cup-shaped or cylindrically recessed end portion, and a plate attachable to the mouth of the recessed part as a substitute closure therefor when the secondary section is inoperative, said closure plate carrying a spring positioned to supply opposition to compensate for the force required to actuate the brakes of the trailer.

2. The subject matter of claim 1 and, said closure plate being furnished with a tubular housing for said spring, said housing containing a follower against which said spring acts.

3. In a device of the kind described, a coupler consisting of a primary and a secondary piston section detachably related to each other and each having a piston rod, means to operatively relate said piston rods, whereby the piston rod of said primary section causes action of that of the secondary section to apply the brakes of a trailer, and a plate attachable to the mouth of said primary section as a substitute closure therefor when the secondary section is detached, said closure plate carrying a spring positioned to supply to the primary piston opposition to compensate for the force required to actuate the brakes of the trailer.

4. In a device of the kind described, a coupler including a cylinder, a piston in said cylinder, a piston rod for said piston having a portion extendible beyond the end of said cylinder, and closure means for the end of said cylinder to confine the end of said rod within the limits of said cylinder, and yieldingly oppose its outward movement.

5. In a device of the kind described, a primary piston cylinder, a secondary piston cylinder, said cylinders being mounted in a juxtaposed parallel relation to each other and each of said cylinders having within it a piston with a rod which projects from it in the same direction as its fellow, a transmission lever pivotally mounted at its mid-length portion with one of its end portions in a laterally contactable relation to one of said piston rods and its opposite end portion in a like contactable relation to the other of said piston rods, means to supply pedal controlled operating pressure to said primary cylinder, a mounting plate upon which both of said piston cylinders are mounted, said cylinders being spaced apart in the direction of the length of said mounting plate, a support for said mounting plate, and means to releasably secure said mounting plate to said support in different adjustments with relation to the length of said mounting plate thereby varying the contact distances of said piston rods with said transmission lever in relation to the pivotal mounting of said lever, a braking system, and means to transmit the piston-produced braking pressures from said secondary cylinder to said braking system.

6. In a device of the kind described, a primary piston cylinder, a secondary piston cylinder, said cylinders being mounted in a juxtaposed parallel relation to each other and each of said cylinders having within it a piston with a rod which projects from it in the same direction as its fellow, a transmission lever pivotally mounted at its mid-length portion with one of its end portions in a laterally contactable relation to one of said piston rods and its opposite end portion in a like contactable relation to the other of said piston rods, means to supply pedal controlled operating pressure to said primary cylinder, means to transmit piston-produced braking pressures from said secondary cylinder to a secondary braking system, one of said cylinders having a cup-shaped or cylindrically recessed end portion, and a plate attachable to the mouth of said recessed part as a substitute closure therefore when said secondary braking system is detached, said closure plate carrying a spring positioned to supply to the piston rod of its cylinder opposition to compensate for the force required to actuate said secondary braking system.

7. In a device of the kind described, a primary cylinder, a secondary cylinder, said cylinders being mounted in a juxtaposed parallel relation to each other and each of said cylinders having within it a piston with a rod which projects from it in the same direction as its fellow, a transmission lever pivotally mounted at its mid-length portion with one of its end portions in a laterally contactable relation to one of said piston rods and its opposite end portion in a like contactable relation to the other of said piston rods, a primary brake system, means to supply pedal controlled operating pressure to said primary brake system whereby to actuate said primary cylinder, a mounting plate upon which both of said cylinders are mounted, said cylinders being spaced apart in the direction of the length of said mounting plate, a support for said mounting plate, and means to releasably secure said mounting plate to said support in different adjustments with relation to the length of said mounting plate thereby varying the contact distances of said piston rods with said transmission lever in relation to the pivotal mounting of said lever, a secondary braking system, and means to transmit the piston-produced braking pressures from said secondary cylinder to said secondary braking system.

LARRY VAN DEREN.